United States Patent [19]

Gill

[11] Patent Number: 5,238,513
[45] Date of Patent: Aug. 24, 1993

[54] METHOD OF FORMING A VEHICLE SEAT WITH A REMOVABLE VACUUM SEAL

[75] Inventor: Jon R. Gill, Mt. Clemens

[73] Assignee: Hoover Universal, Inc., Plymouth, Mich.

[21] Appl. No.: 480,837

[22] Filed: Feb. 16, 1990

[51] Int. Cl.$^5$ ............................................. B32B 31/00
[52] U.S. Cl. ........................................ 156/64; 156/196; 156/212; 156/213; 156/220; 156/221; 156/285; 297/DIG. 1; 297/DIG. 2
[58] Field of Search ................... 297/DIG. 7, DIG. 2; 156/196, 212, 213, 220, 221, 285, 64

[56] References Cited

U.S. PATENT DOCUMENTS 2,814,077 11/1957 Moncrieff ........................ 156/285 X
4,052,241 10/1977 Walter ............................. 156/285 X
4,975,135 12/1990 Lowe ........................ 297/DIG. 2 X Primary Examiner—David A. Simmons
Assistant Examiner—Merrick Dixon
Attorney, Agent, or Firm—Harness, Dickey & Pierce

[57] ABSTRACT

A method of manufacturing a portion of a vehicle seat assembly utilizing a stylized forming tool and bonding a seat cover to a foam seat bun having a predetermined surface contour. The seat cover is positioned exterior side down on the stylized forming tool. A film of air impermeable material is then placed over the seat cover and a vacuum is applied between the impermeable material and the forming tool so as to draw the seat cover down into substantial conformity with style lines on the upper surface of the forming tool. The impermeable material is then removed and an adhesive coated foam seat bun is positioned and compressed against the seat cover on the forming tool. Once the seat cover and the seat bun are bonded together by the adhesive, the seat assembly is removed from the forming tool. The outer edges of the seat covers are then fastened together or to the underside of the seat bun so as to complete the assembly of the seat portion.

9 Claims, 3 Drawing Sheets

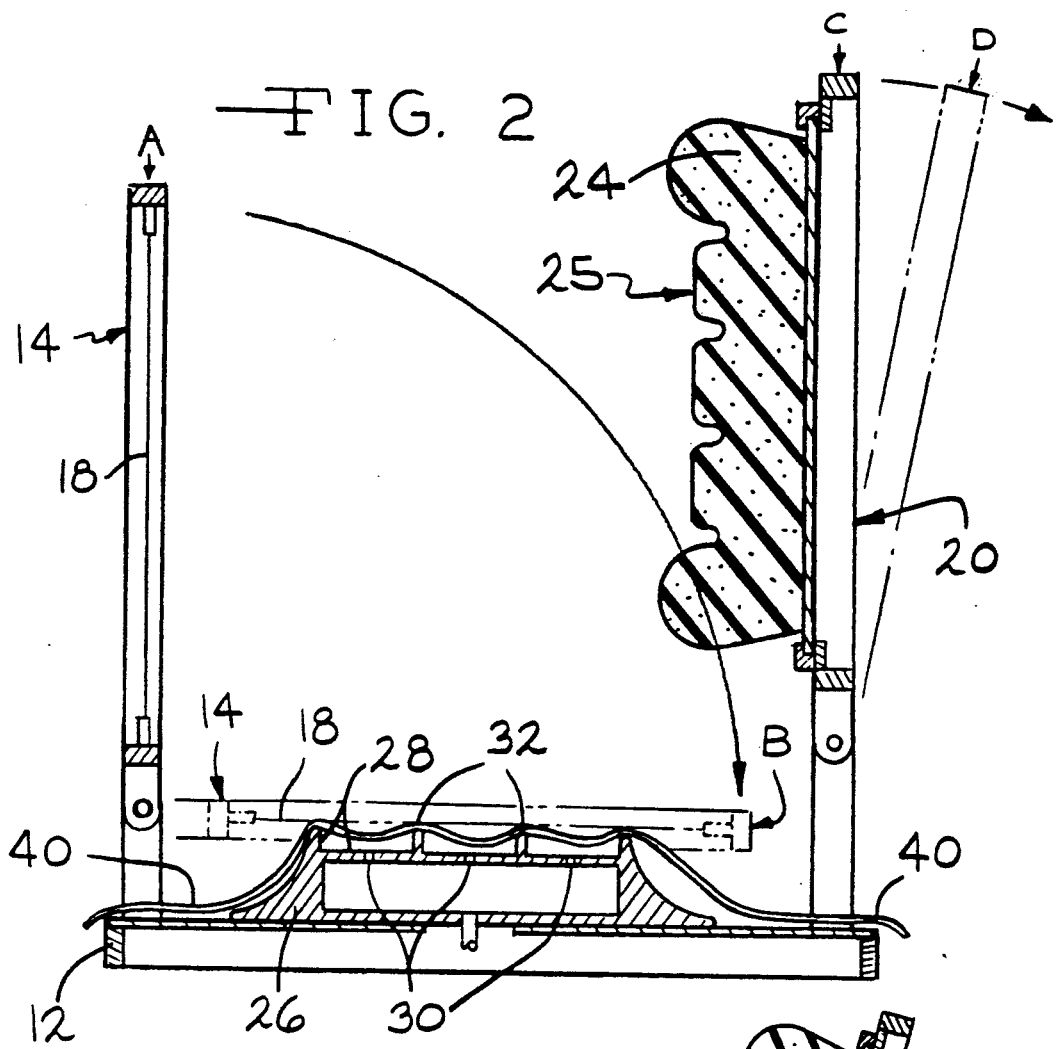
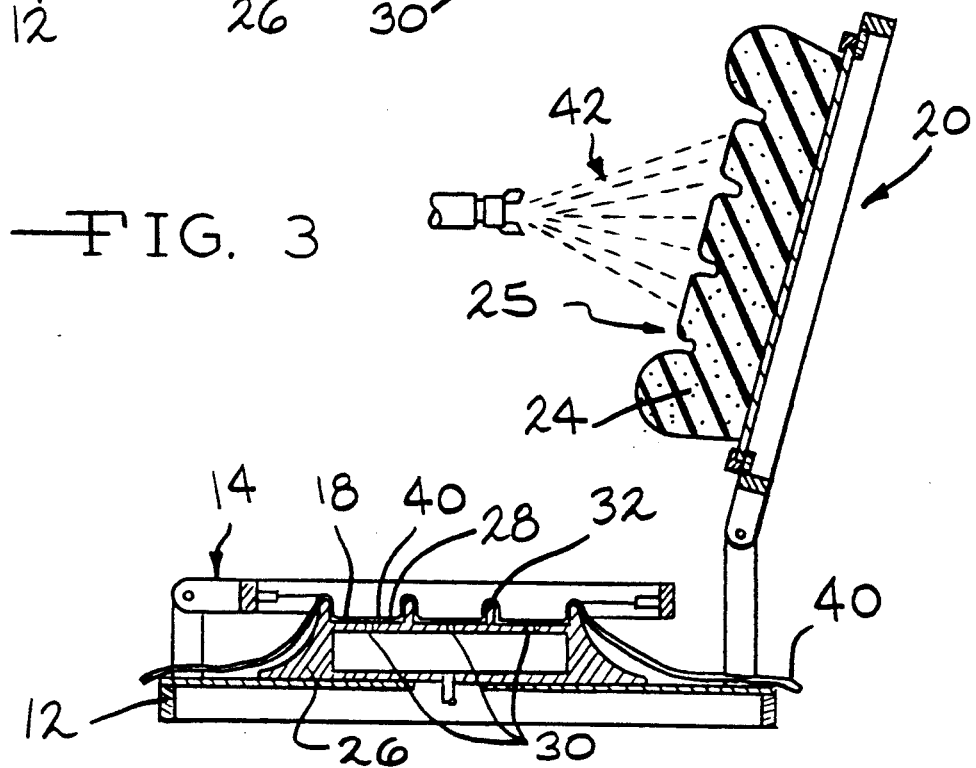

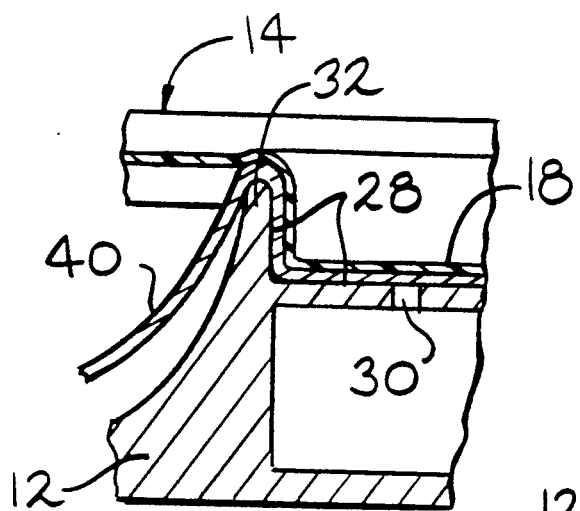
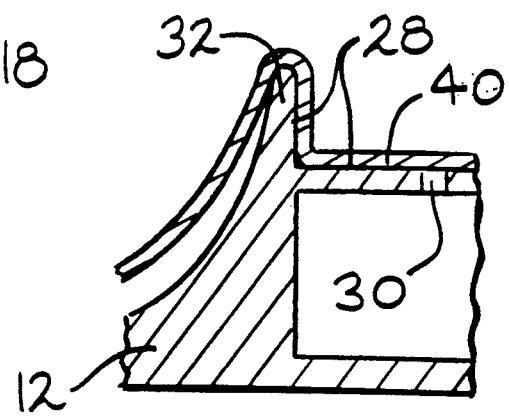
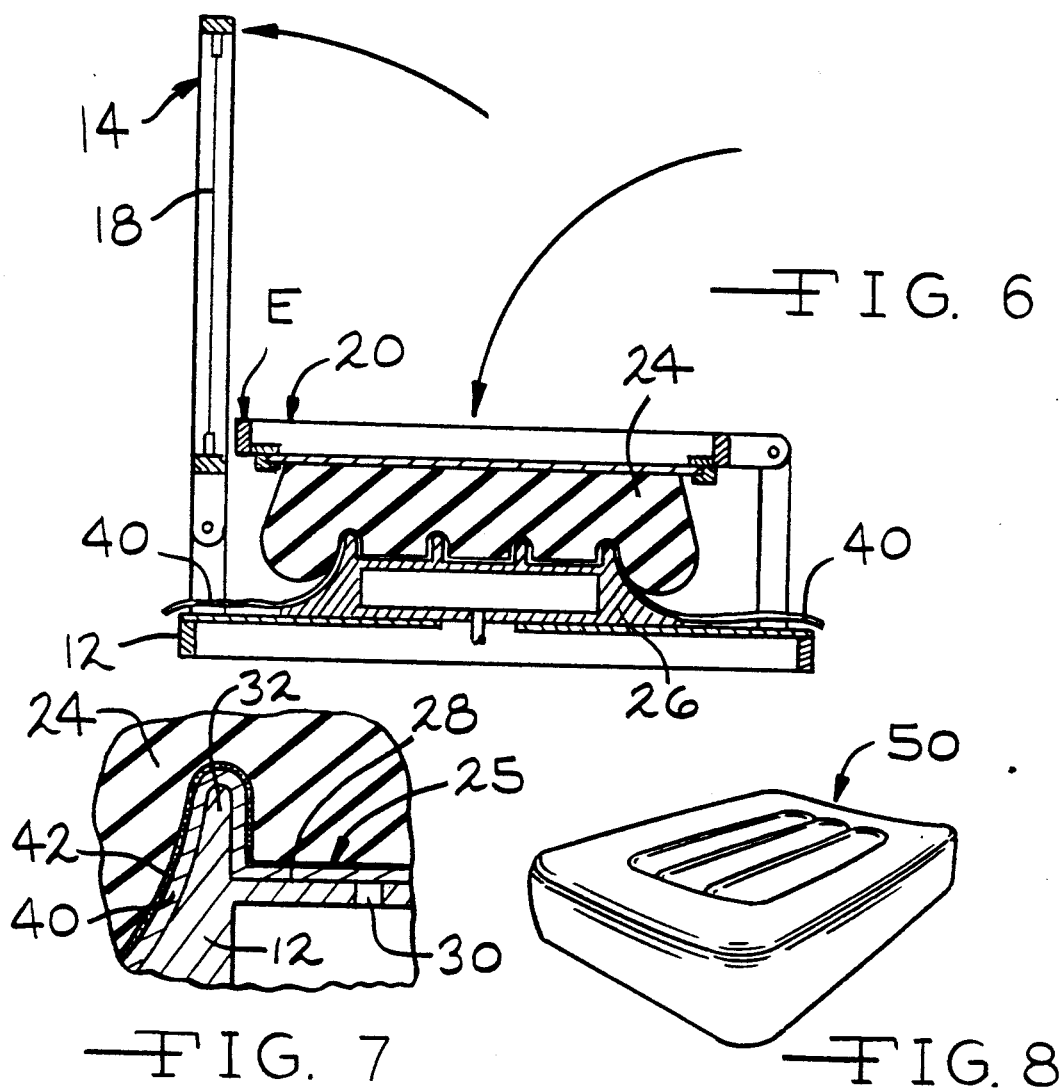

METHOD OF FORMING A VEHICLE SEAT WITH A REMOVABLE VACUUM SEAL

BACKGROUND AND SUMMARY OF THE INVENTION

This invention relates generally to the field of vehicle seat assemblies and more particularly to a method of forming a vehicle seat having a stylized, contoured surface.

Typically, in the production of a vehicle seat, a forming tool is constructed having a surface contour complementary to the desired shape of the finished vehicle seat or back. One example of such a tool is disclosed in U.S. Pat. No. 4,740,260, issued Apr. 26, 1988, entitled "Method And Apparatus For Manufacturing Seats And Articles Formed Thereby", assigned to the assignee of the present invention. Another method of forming contours in vehicle seat members is disclosed in U.S. patent application Ser. No. 205,929, filed Jun. 13, 1988, entitled "Vehicle Seat Assembly With Pour In Place Foam Body", and assigned to the assignee of this application.

In both the above mentioned application and patent, a vehicle seat cover member is placed inside out on the forming tool. A pressing tool, having contours the same as the desired finished product, then applies pressure against the seat cover member to conform the cover member to the contours of the forming tool. The pressing and forming tools described in the above patent and application must be individually tooled for each new seat design. Accordingly, the tools are relatively expensive to produce.

Along with increased tooling expenses, prior art methods exhibit other limitations. One limitation is the bulk of the machinery required during the pressing stage. A second limitation is the general inability to detect wrinkles in the seat cover member before the bonding of a foam seat bun to the cover member. Elaborate surface contours are still another limitation because of unequal material distribution occurring during the pressing stage.

Forming tools having removable style inserts, which permit the simple modification or changing of the insert instead of the complete replacement of the tool, are described in U.S. patent application Ser. No. 310,351, filed Feb. 14, 1989, and assigned to the assignee of this application. These forming tools allow for the easy interchanging of styles and thus, a reduction in overall tooling costs.

During assembly of a vehicle seat, the seat cover member is placed over the forming tool and drawn into substantial conformity with the style lines or contours of the insert. The drawing of the material is accomplished either by press forming with an appropriately shaped pressing tool or by a vacuum forming process. A foam seat bun is then adhered to the seat cover member with a suitable adhesive.

In order to properly form the desired seat surface, the seat bun must have a predetermined shape corresponding to the style insert used to form the contours in the seat cover member. Thus, different seat buns are required for each different contour style desired in a finished vehicle seat surface.

U.S. patent application Ser. No. 345,789, filed May 1, 1989, also assigned to the assignee of this application, discloses a method for eliminating the requirement of seat buns having a predetermined shape in order to more economically fabricate the finished vehicle seat assembly. The method disclosed in the proceeding patent application first constructs a composite layer by laminating a breathable seat cover member to a polymeric foam sheet. This composite is then cut into a shape appropriate for the style insert being used. A seat skirt fabric is then sewn to the edges of the cover member of the composite. The composite portion is then positioned with the cover member down against the style insert of the forming tool. Next, a sheet of impermeable barrier material is placed over the foam surface of the composite. A vacuum then draws the composite into substantial conformity with the style insert. A flat upper surface of a generic foam seat bun is then sprayed with a suitable adhesive and pressed against the drawn composite. Finally, heat, which can be in the form of steam, is forced through the composite to partially evaporate the barrier. The foam surface of the composite is thus enabled to bond to the foam seat bun.

A problem incurred by the proceeding and other prior art is breathability. Incorporation of the barrier material into the seat construction, as done in vacuum forming, initiates the problem. In some situations the seat is completely non-breathable. This arises when the entire layer of impermeable barrier material remains an element of the seat construction. In other situations the finished seat is semi-breathable. U.S. patent application Ser. No. 345,789, where the barrier material is partially evaporated, displays this limitation.

It is an object of the present invention to eliminate breathability problems while continuing to employ a vacuum forming process. It is another object of the invention to eliminate forming process errors and the various problems associated with elaborate seat designs. In so doing, machinery bulk and tooling costs will also be reduced.

The method according to the present invention first places a seat cover member, exterior side down, over a forming tool. The forming tool can be any of those presently used in the industry which employ vacuum forming.

After the seat cover member is properly positioned, a thin sheet of clear barrier material, such as latex or polyolefin film, is presented over the seat cover member. The barrier material will form an air impermeable layer over the seat cover member and the upper surface of the forming tool. Next, the barrier material and the seat cover member are drawn down into conformity with the style lines of the forming tool by the application of negative pressure across a series of vacuum ports located in the upper surface of the forming tool. Thus, atmospheric pressure is allowed to compress the seat cover member into substantial conformity with the upper surface of the forming tool.

Once the seat cover member is conforming to the upper surface of the forming tool, the vacuum pressure is released. The barrier material is then removed while the seat cover member is maintained in conformity with the upper surface of the forming tool by frictional forces. A visual inspection for discontinuities in the seat cover member can now be conducted.

A foam seat bun, coated with a suitable adhesive such as polyurethane adhesive, is then compressed against and bonded to the seat cover member on the forming tool. Once the cover member is bonded to the foam seat bun, the assembly is removed from the forming tool for completing the construction of the seat assembly.

The above described method can easily be adapted for use with various types and styles of forming tools, including those having the changeable inserts. The above method can also be adapted for use with the various styles of foam seat buns, premolded or the generic type having stylized composite inserts. Additionally, the method can be easily adapted to construct seat backs.

Thus, the method for forming a portion of a vehicle seat assembly according to the present invention may be summarized as including the following steps:

a. placing a seat cover member exterior side down on a forming tool having an upper surface complimentary to the desired surface contour of the finished seat assembly;
b. combining a layer of barrier material with the seat cover member on the forming tool;
c. drawing a vacuum between the forming tool and the barrier material;
d. drawing the seat cover member and the barrier material into substantial conformity with the upper surface of the forming tool;
e. applying an adhesive to the appropriate surface of a foam seat bun;
f. releasing the vacuum between the forming tool and the barrier material;
g. removing the barrier material from the seat cover member and forming tool;
h. inspecting the seat cover member visually for wrinkles and other discontinuities;
i. pressing the adhesive laden surface of the foam seat bun against the seat cover member on the forming tool; and
j. removing the foam seat bun and bonded seat cover member from the forming tool, thus forming a portion of a vehicle seat assembly having the desired styled surface contour. Further objects, features and advantages of the present invention will become evident from a consideration of the detailed description when taken in conjunction with the accompanying drawing and the appended claims.

BRIEF DESCRIPTION OF THE DRAWINGS

FIG. 2 is a transverse sectional view showing the relative movements of the structure in FIG. 1.

FIG. 3 is a transverse sectional view of the structure shown in FIG. 1 with the barrier material and the seat cover member being vacuum drawn into conformity with the upper surface of the forming tool while a surface of the foam seat bun is being applied with adhesive.

FIG. 4 is an enlarged sectional view of a portion of the structure shown in FIG. 3 with the barrier material and seat cover member vacuum drawn into conformity with the upper surface of the forming tool.

FIG. 5 is an enlarged sectional view of FIG. 4 with the barrier material removed.

FIG. 6 is a transverse sectional view of the structure shown in FIG. 1 with the foam seat bun being compressed against the seat cover member.

FIG. 7 is an enlarged sectional view of a portion of the structure shown in FIG. 6.

FIG. 8 is a perspective view of a vehicle seat cushion assembled in accordance with the method of the present invention.

DETAILED DESCRIPTION OF THE INVENTION

Figure 1:
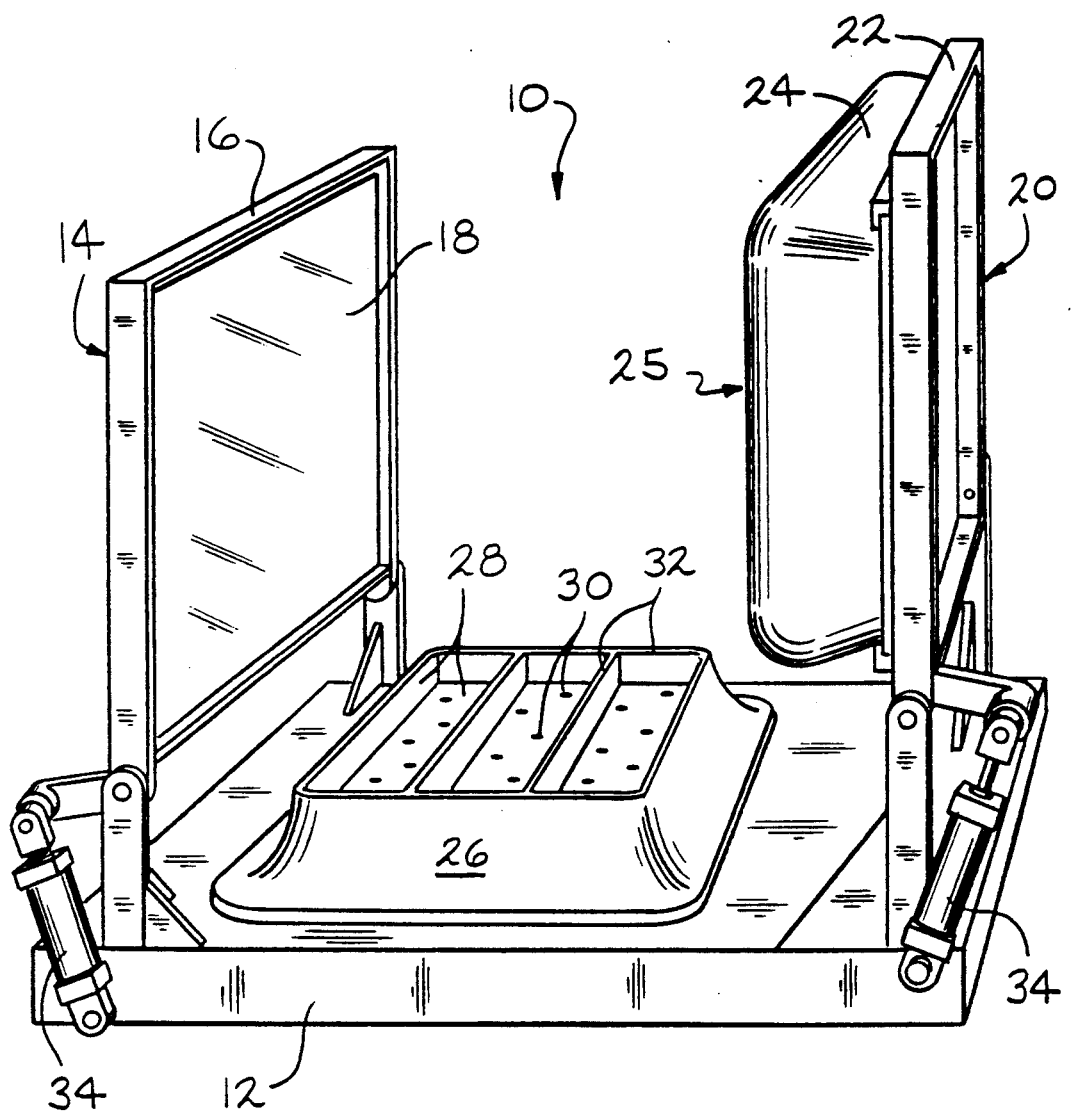
FIG. 1 is a perspective view of one embodiment of the structure for forming a portion of a vehicle seat assembly in accordance with the method of the present invention.

Referring now to the drawings, FIG. 1 shows one embodiment of a structure 10 for the forming a vehicle seat cushion in accordance with the principles of the present invention. The structure 10 consists of two opposingly hinged arms extending upward from opposite ends of a base 12. One arm 14 (hereinafter "barrier arm") consists of a frame like enclosure 16 for holding a plyable sheet of air impermeable barrier material 18, such as latex or polyolefin film. The second arm 20 (hereinafter "cushion arm") consists of a frame like structure 22 for holding a foam seat bun 24 or cushion. The seat bun 24 can be constructed of various materials, including thermoplastic foam, and has a surface of predetermined shape 25 corresponding to the desired final cushion surface contour.

Centrally disposed on the base 12 of the structure 10 is a seat cover member forming tool 26. The forming tool 26 has an upper surface 28 of a shape complementary to the surface of predetermined shape 25 of the seat bun 24. The upper surface 28 of the forming tool 26 also contains a series of intermittently positioned vacuum ports 30.

The present invention can be easily adapted to the various types of forming tools currently employed in the industry. These include both forming tools having a single surface style and forming tools capable of employing various style inserts.

Barrier arm 14 and cushion arm 20 can be lowered and raised to allow their respectively held components to engage and disengage the upper surface 28 of the forming tool 26. This can be accomplished through the use of several different means. One such means is the use of hydraulic or pneumatic pumps 34 as shown in FIG. 1. One might also use a reversible motor and gearing mechanism.

A seat cover member 40 is then positioned inside out over the upper surface 28 of the forming tool 26. The seat cover member 40 is a generally porous material having an exterior surface of color and texture calculated to visually enhance the interior of a vehicle.

Once the seat cover member 40 is properly positioned over the upper surface 28 of the forming tool 26, the barrier arm 14 lowers the barrier material 18 from position A to position B as shown in FIG. 2. The barrier material 18 is lowered so as to create an air tight seal along style lines 32 of the forming tool 26. Positioned as such, the seat cover member 40 is sandwiched between the style lines 32 of the upper surface 28 of the forming tool 26 and the barrier material 18. In order to facilitate the lowering of the barrier arm 14, the cushion arm 20 swings outward from position C to position D.

With the barrier material 18 forming an air tight seal along the style lines 32 of the upper surface 28 of the forming tool 26, a vacuum pump (not shown) draws a vacuum across a series of vacuum ports 30. Atmospheric pressure then causes the barrier material 18 and the seat cover member 40 to be drawn into substantially surface to surface conformity with the upper surface 28 of the forming tool 26, as shown in FIGS. 3 and 4.

The surface of predetermined shape 25 of the seat bun 24 is then sprayed with an adhesive 42, such as polyurethane adhesive. The vacuum pump then releases the vacuum pressure and the barrier arm 14 raises the barrier material 18 out of substantial conformity with the seat cover member 40 and the upper surface 28 of the forming tool 26.

With the barrier material 18 removed, the seat cover member 40 remains in substantially surface to surface conformity with the upper surface 28 of the forming tool 26 as seen in FIG. 5. To ensure this substantial conformity between the upper surface 28 of the forming tool 26 and the seat cover member 40, a visual inspection of the seat cover member 40 is made for wrinkles and other discontinuities. This inspection might be performed manually or by automated scanning machines.

Once visual inspection of the seat cover member 18 proves satisfactory, the cushion arm 20 is lowered from position D to position E. The adhesive laden surface of predetermined shape 25 is then compressed against the seat cover member 40 until the adhesive bonds the seat cover member 40 to the surface of predetermined shape 25 of the seat bun 24. This is shown in FIGS. 6 and 7.

Once bonded, the seat bun 24 and seat cover member 40 are removed from both the forming tool 26 and the cushion arm 20 to allow assembly of the cushion into its final form 50.

Thus, the method in accordance with the present invention may be summarized as placing a porous seat cover member 40 inside out over a forming tool 26 having an upper surface 28 shaped complementary to a surface of predetermined shape 25 of a seat bun 24, positioning a sheet of barrier material 18 over the seat cover member 40 on the forming tool 26, applying a vacuum between the barrier material 18 and the forming tool 26 so as to draw both the barrier material 18 and the seat cover member 40 into substantially surface to surface contact and conformity with the upper surface 28 of the forming tool 26, applying an adhesive 42 to the surface of predetermined shape 25 of the seat bun 24, removing the barrier material 18 while retaining the seat cover member 40 in substantially surface to surface conformity with the upper surface 28 of the forming tool 26, compressing the adhesively coated surface of predetermined shape 25 of the seat bun 24 against the seat cover member 40, allowing the seat cover member 40 to bond to the surface of predetermine shape 25 of the seat bun 24, and finally removing the bonded seat cover member 40 and seat bun 24 from the forming tool 2 and cushion arm 20 in order to finish assembly of the seat cushion into final form 50.

In an alternative embodiment, a second vacuum is applied directly over the seat bun 24 once the seat bun 24 has been compressed against the cover member 40. Here, the surface of cushion arm 20 holding the seat bun 24 is provided with an impermeable bladder or similar material and a second vacuum is drawn by the vacuum pump across the vacuum ports 30. In so doing, the second vacuum provides for increased definition, improved bonding and accelerated bonding and production time.

Depending on the particular characteristics of the foam seat bun 24, vacuum leakage may occur through the side bolsters of the seat bun 24. If the leakage proves to be excessive, the cushion carrier 20 may be modified so as to contact the forming tool 26 over the seat bun 24 and thus provide a full vacuum seal.

The method according to the present invention allows for a decrease in tooling costs, a decrease in wrinkling and therefore scraping rate, an increase in breathability, and an increase in the variation and elaboration of styling permitted in seat cushions. The outer edges of the seat trim material may be sewn together or sewn to halves of a zipper so as to complete the assembly of the seat cushion into it final form 50. A vehicle seat back may also be formed in a manner similar to that disclosed above for the vehicle seat cushion.

While the above description constitutes the preferred embodiments of the present invention, it will be appreciated that the invention is susceptible to modification, variation and change without departing from the proper scope and fair meaning of the accompanying claims.

What is claimed is:

1. A method of forming a vehicle seat with a surface of predetermined shape, said method comprising the steps of;
  a. placing a porous cover material over a surface of a forming tool being of complementary shape to said surface of predetermined shape;
  b. positioning an air impermeable barrier material over said cover material on said forming tool;
  c. applying a vacuum between said forming tool and said barrier material;
  d. drawing said barrier material and said cover material substantially against and into surface to surface conformity with said surface of said forming tool;
  e. applying adhesive to said surface of predetermined shape of a thermoplastic foam seat bun;
  f. removing said barrier material from substantially surface to surface conformity with said cover material and said surface of said forming tool;
  g. inspecting said cover material visually for discontinuities in said substantially surface to surface conformity with said surface of said forming tool;
  h. pressing said adhesively coated surface of said seat bun against said cover material on said forming tool after said inspecting step and allowing said surface of said seat bun to bond with said cover material; and
  i. removing said seat bun and bonded cover material from said forming tool.

2. The method according to claim 1 further comprising the steps of providing a sheet of impermeable barrier material over said seat bun when said set bun is pressed against said cover material and applying a vacuum between said forming tool and said sheet of impermeable barrier material while allowing said surface of said seat bun to bond with said cover material.

3. In a method of forming a vehicle seat with predetermined contours, the steps of:
  a. providing a means for forming a vehicle seat including a base, a forming tool disposed centrally on said base, said forming tool having an upper surface of complementary shape to said predetermined contours, said upper surface also having vacuum ports, said vacuum ports being connected to a vacuum pump, said base also having opposingly hinged arms positioned on opposite ends thereof, a means for alternatingly lowering and raising each of said arms from a substantially vertical position to a substantially horizontal position, one of said arms providing a sheet of air impermeable latex, said other arm providing a thermoplastic foam seat bun having a surface with predetermined contours;
  b. positioning a seat cover member inside out on, said forming tool;
  c. placing said latex over said seat cover member on said forming tool;
  d. creating a vacuum between said upper surface of said forming tool and said latex;

e. drawing said seat cover member and said latex down into substantially surface to surface contact with said upper surface of said forming tool;

f. applying adhesive to said surface with predetermined contours of said thermoplastic foam seat bun;

g. releasing said vacuum between said latex and said upper surface of said forming tool;

h. removing said latex while retaining said seat cover member in substantially surface to surface contact with said upper surface of said forming tool;

i. inspecting said seat cover member for discontinuities in said substantially surface to surface contact with said upper surface of said forming tool;

j. compressing said adhesive coated surface with predetermined contours of said thermoplastic foam seat bun against said seat cover member in substantially surface to surface contact with said upper surface of said forming tool;

k. allowing said thermoplastic foam seat bun and said seat cover member to bond together; and l. removing said thermoplastic foam seat bun and bonded seat cover member from said forming tool.

4. The method according to claim 3 further including the step of applying a vacuum between said upper surface of said forming tool and said arm providing and compressing said thermoplastic foam seat bun against said seat cover member.

5. The method according to claim 3 wherein said inspection is performed manually.

6. The method according to claim 3 wherein said inspection is performed robotically.

7. The method according to claim 3 wherein said discontinuities constitute furrows and ridges in said seat cover member.

8. In a method of forming a vehicle seat with predetermined contours, the steps of:

a. providing a means for forming a vehicle seat including a base, a forming tool having a surface of complementary shape to said predetermined contours, said surface also having a vacuum ports being connected to a vacuum pump, said base having for providing a sheet of air impermeable material, and for providing a foam seat bun having a surface with predetermined contours;

b. positioning a seat cover member on said forming tool;

c. placing said sheet of air impermeable material over said seat cover member on said forming tool;

d. creating a vacuum between said surface of said forming tool and said sheet of air impermeable material;

e. drawing said seat cover member and said sheet of air impermeable material into substantially surface to surface conformity with said surface of said forming tool;

f. applying adhesive to said surface of said foam seat bun having predetermined contours;

g. releasing said vacuum between said sheet of air impermeable material and said surface of said forming tool;

h. removing said sheet of air impermeable material while retaining said seat cover member in substantially surface to surface conformity with said surface of said forming tool;

i. inspecting said seat cover member for discontinuities in said substantially surface to surface conformity with said surface of said forming tool after said removing step;

j. compressing said surface of said foam seat bun coated with adhesive against said seat cover member in substantially surface to surface conformity with said surface of said forming tool after said inspecting step;

k. allowing said foam seat bun and said seat cover member to bond together; and l. removing said foam seat bun and bonded seat cover member from said forming tool.

9. The method according to claim 8 further including the step of applying a vacuum between said surface of said forming tool and said means providing said foam seat bun against said seat cover member to draw said foam seat bun into contact with said seat cover member.

* * * * *

UNITED STATES PATENT AND TRADEMARK OFFICE
CERTIFICATE OF CORRECTION

PATENT NO. : 5,238,513

DATED : August 24, 1993

INVENTOR(S) : Jon R. Gill

It is certified that error appears in the above-identified patent and that said Letters Patent is hereby corrected as shown below:

Column 6:

In Claim 2, line 42, after "said", delete "set" and insert --seat--.

Column 7:

In Claim 8, line 41, after "having" delete "a".

In Claim 8, line 1, after "ing" insert --means--.

In Column 5, line 45, delete "2" and insert --26--.

Signed and Sealed this

Fifth Day of April, 1994

Attest:

BRUCE LEHMAN

Attesting Officer     Commissioner of Patents and Trademarks